M. H. PIPER.
MACHINE FOR COLORING ILLUSTRATIONS.
APPLICATION FILED DEC. 31, 1908.
929,326.
Patented July 27, 1909.
11 SHEETS—SHEET 5.
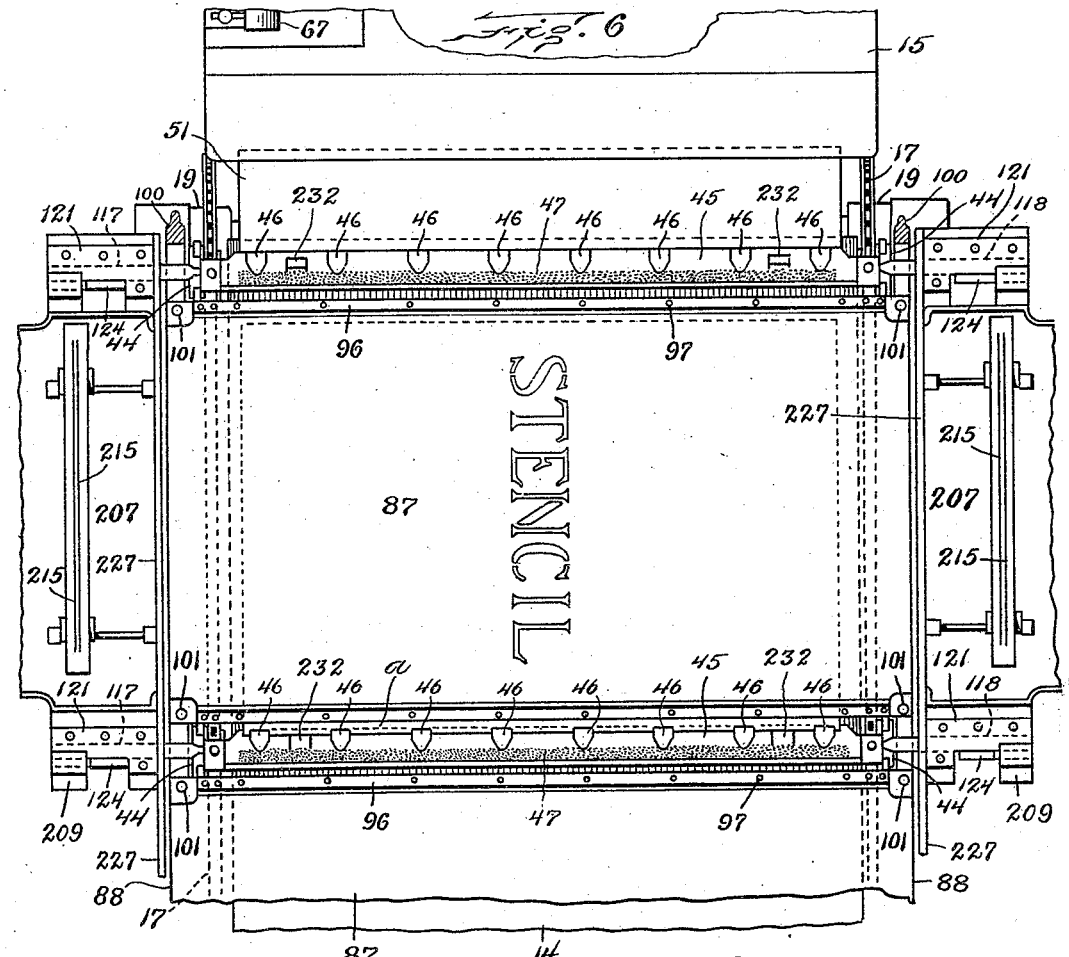
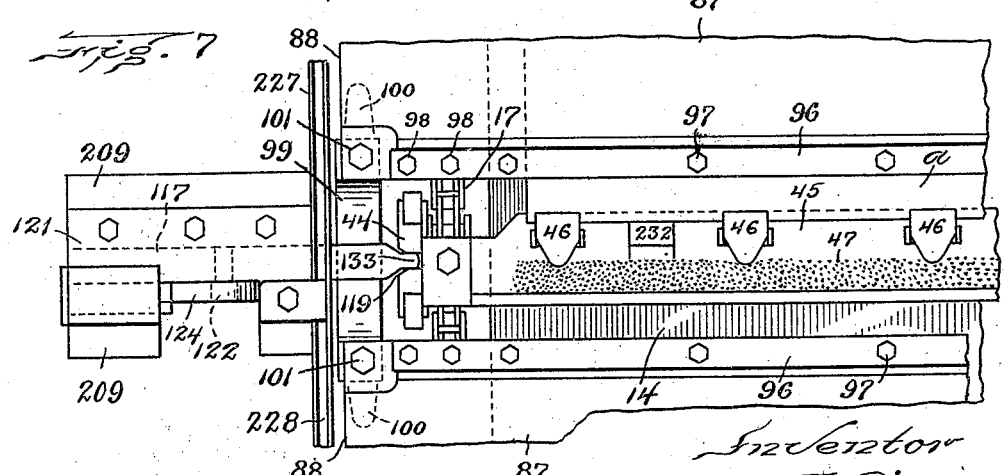

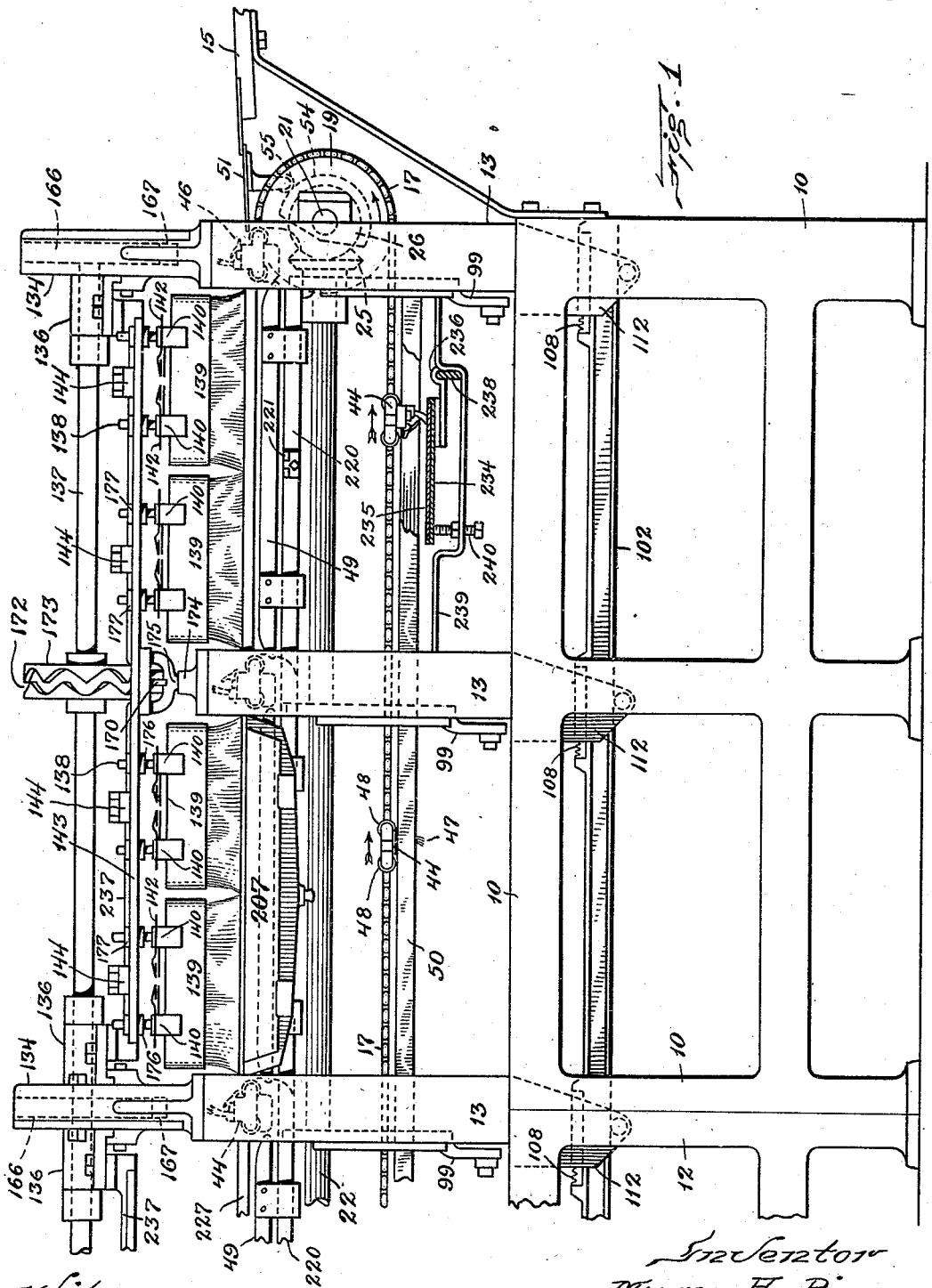

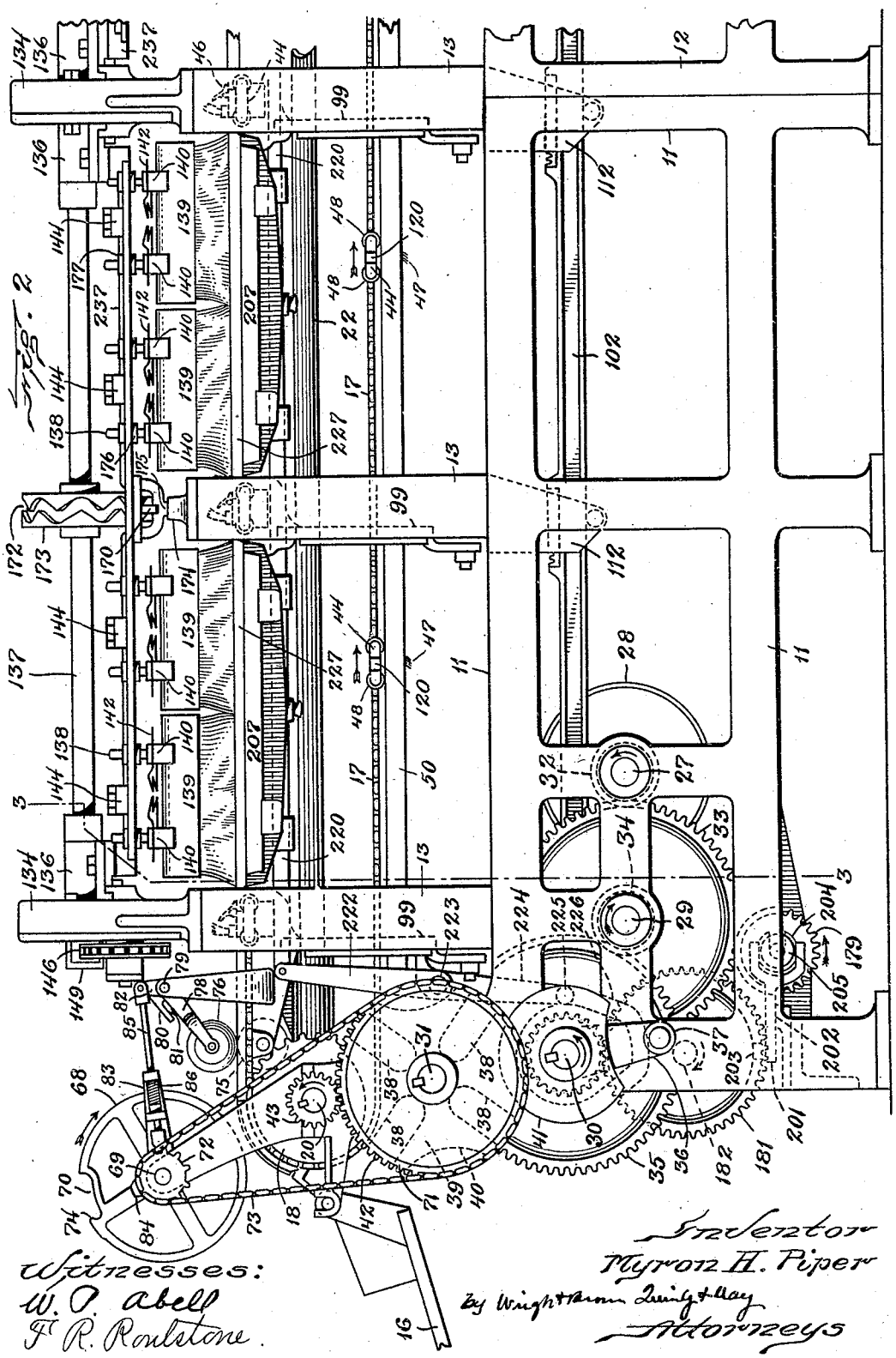

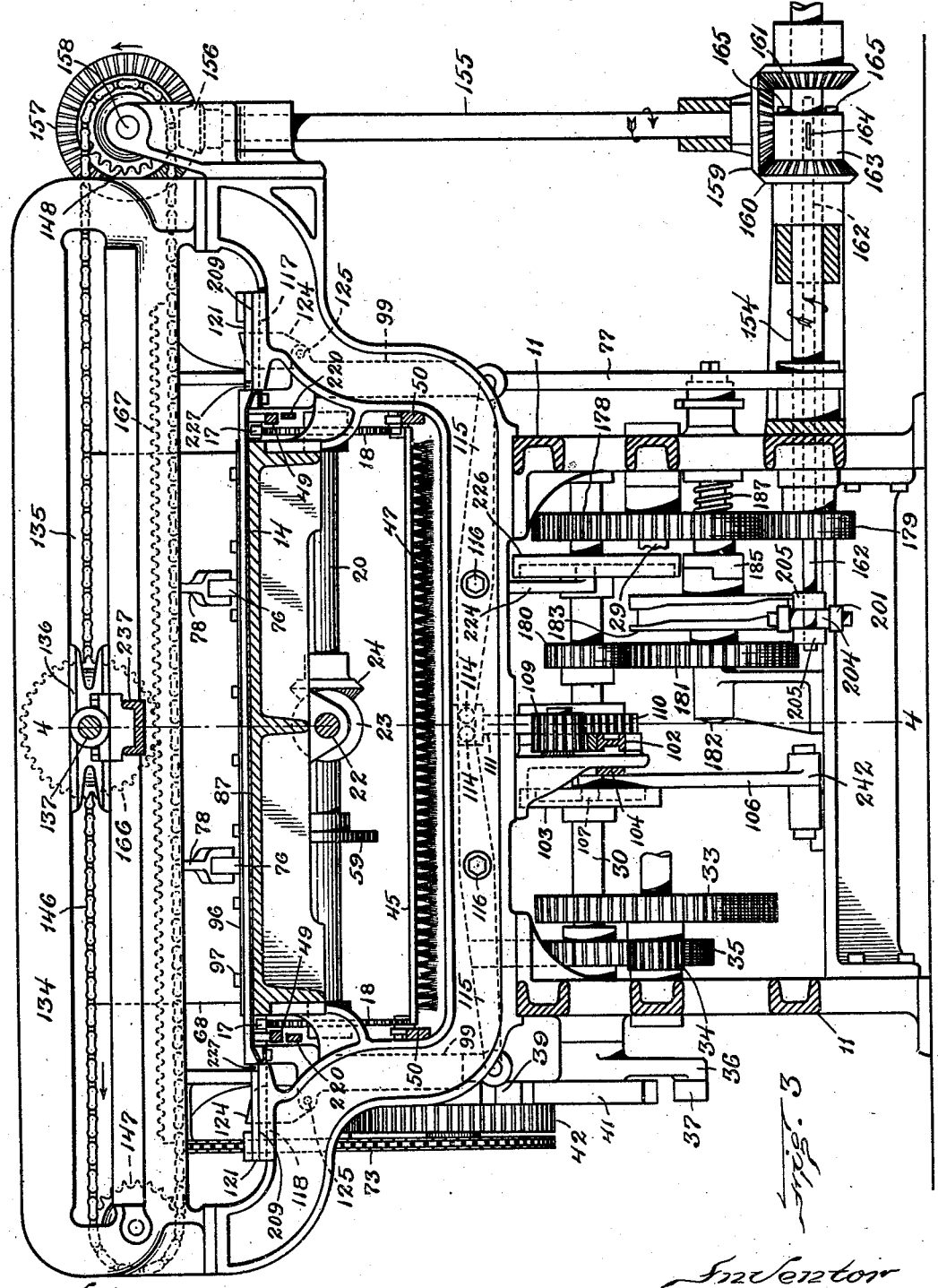

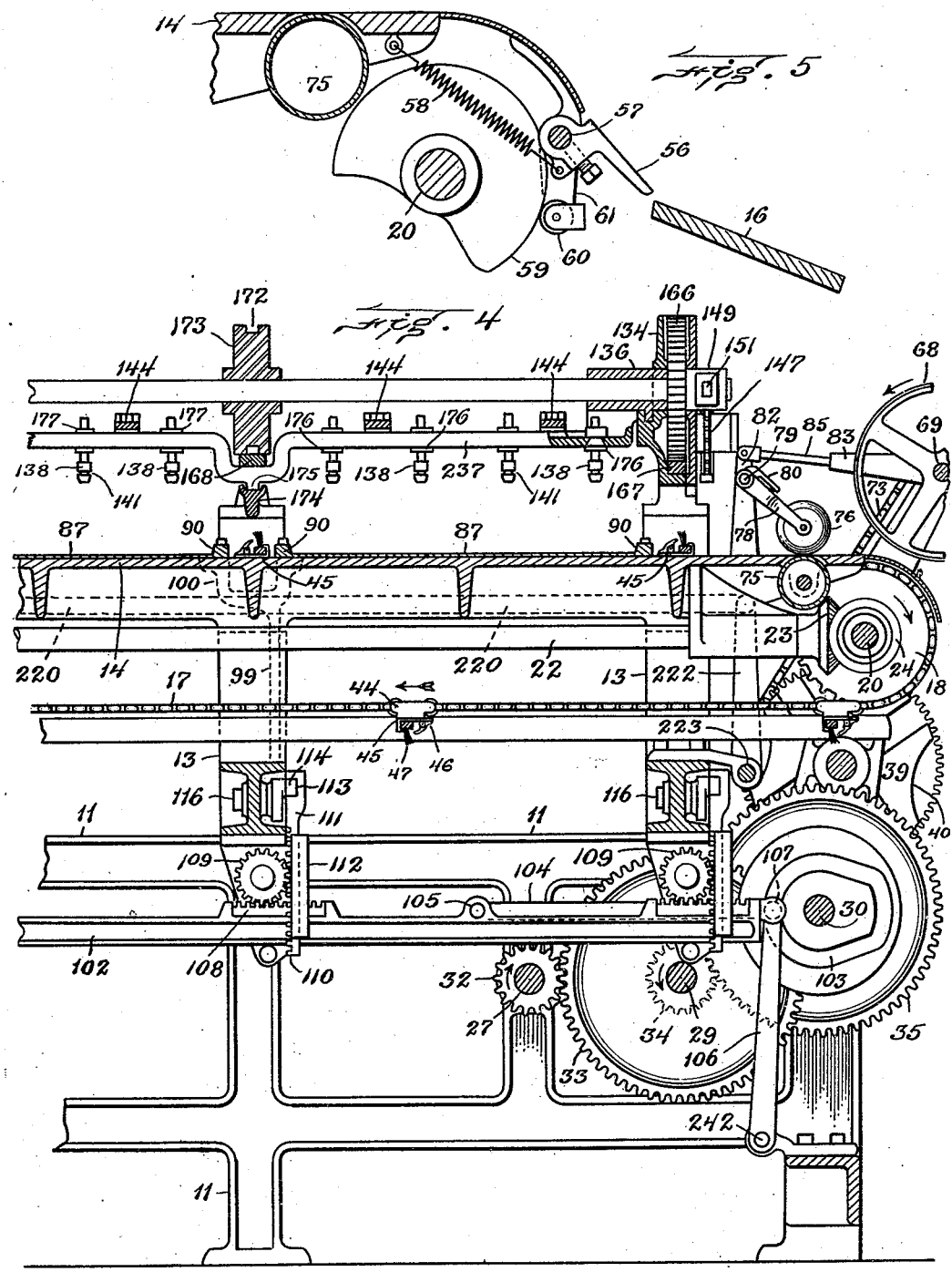

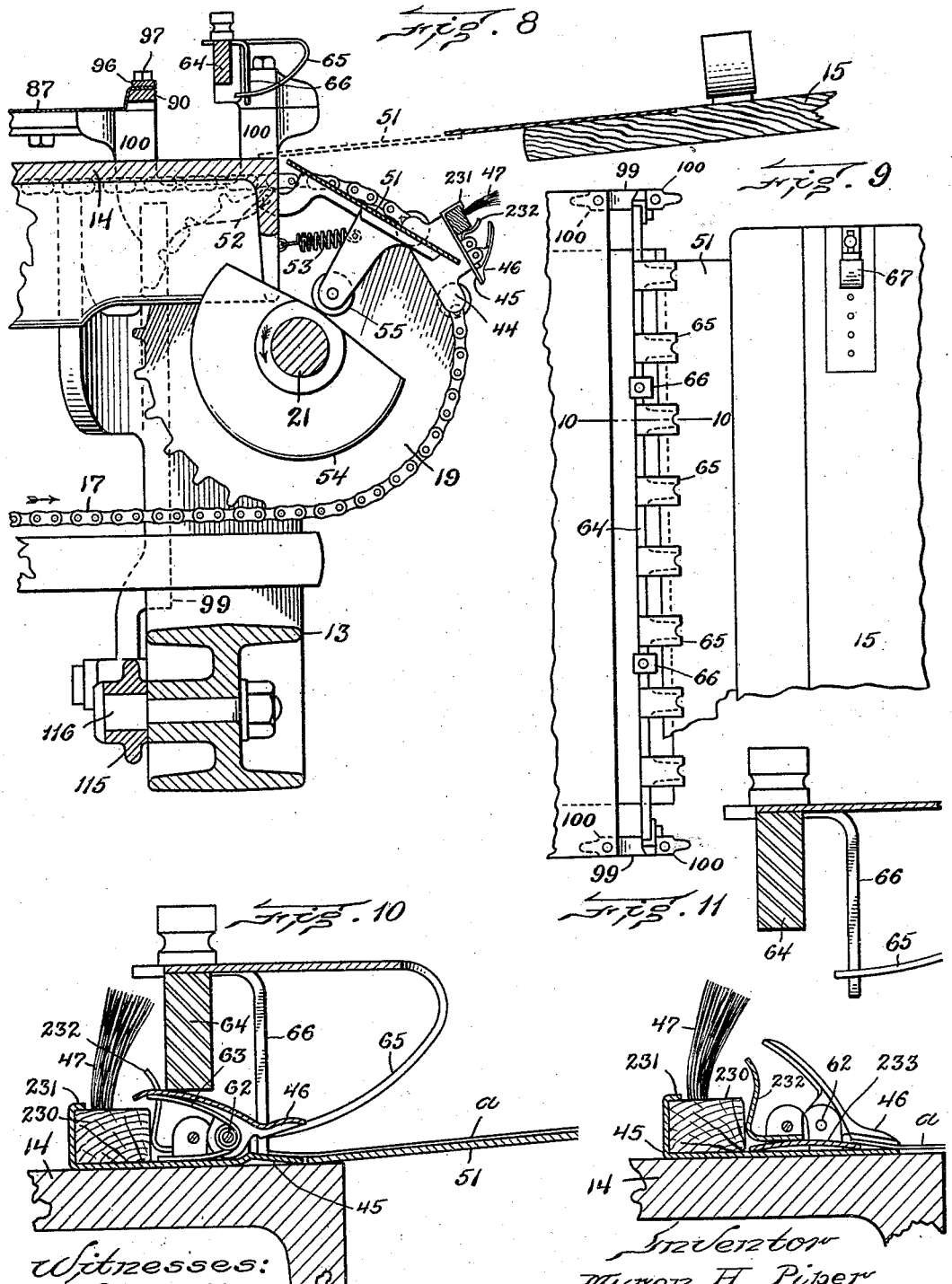

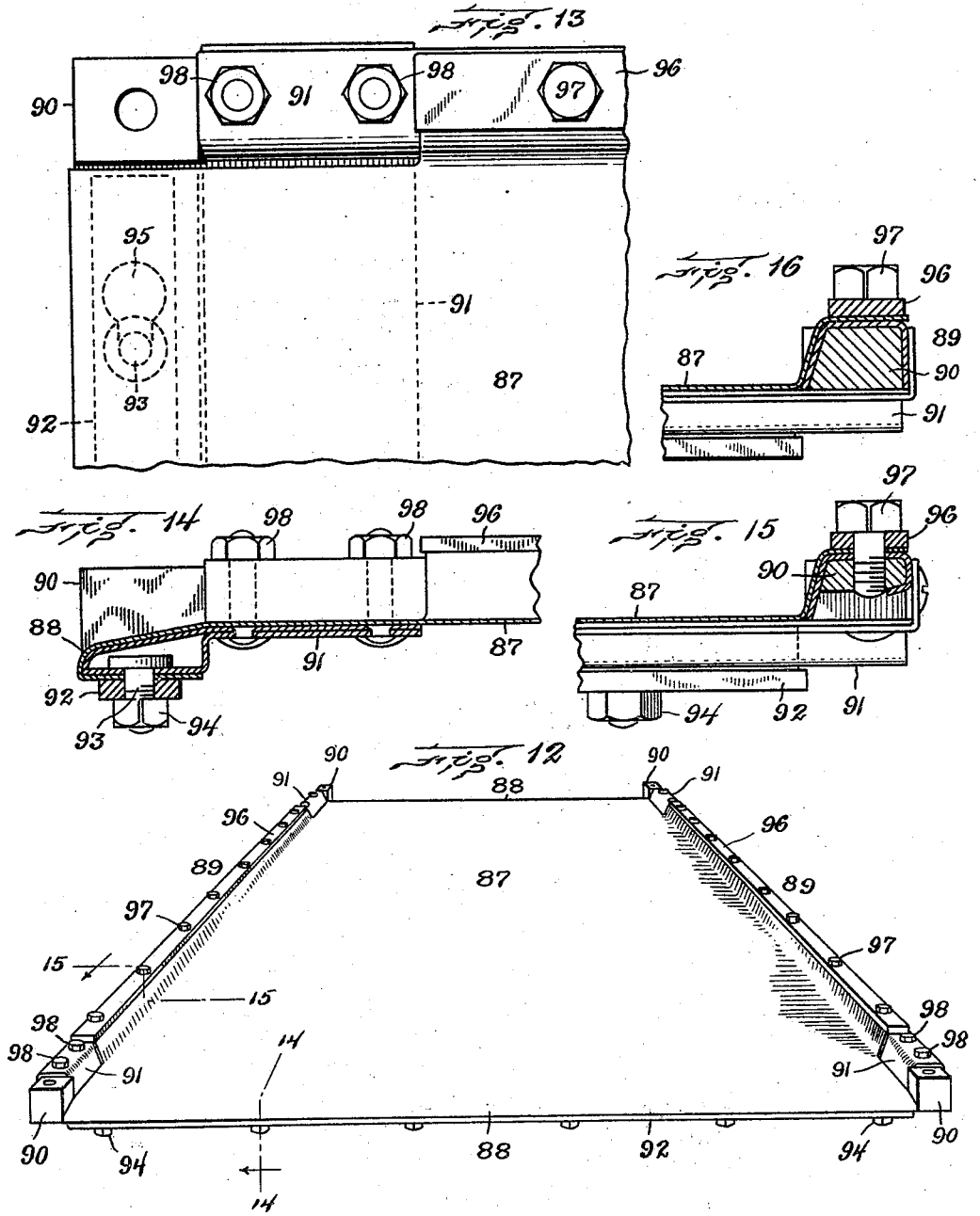

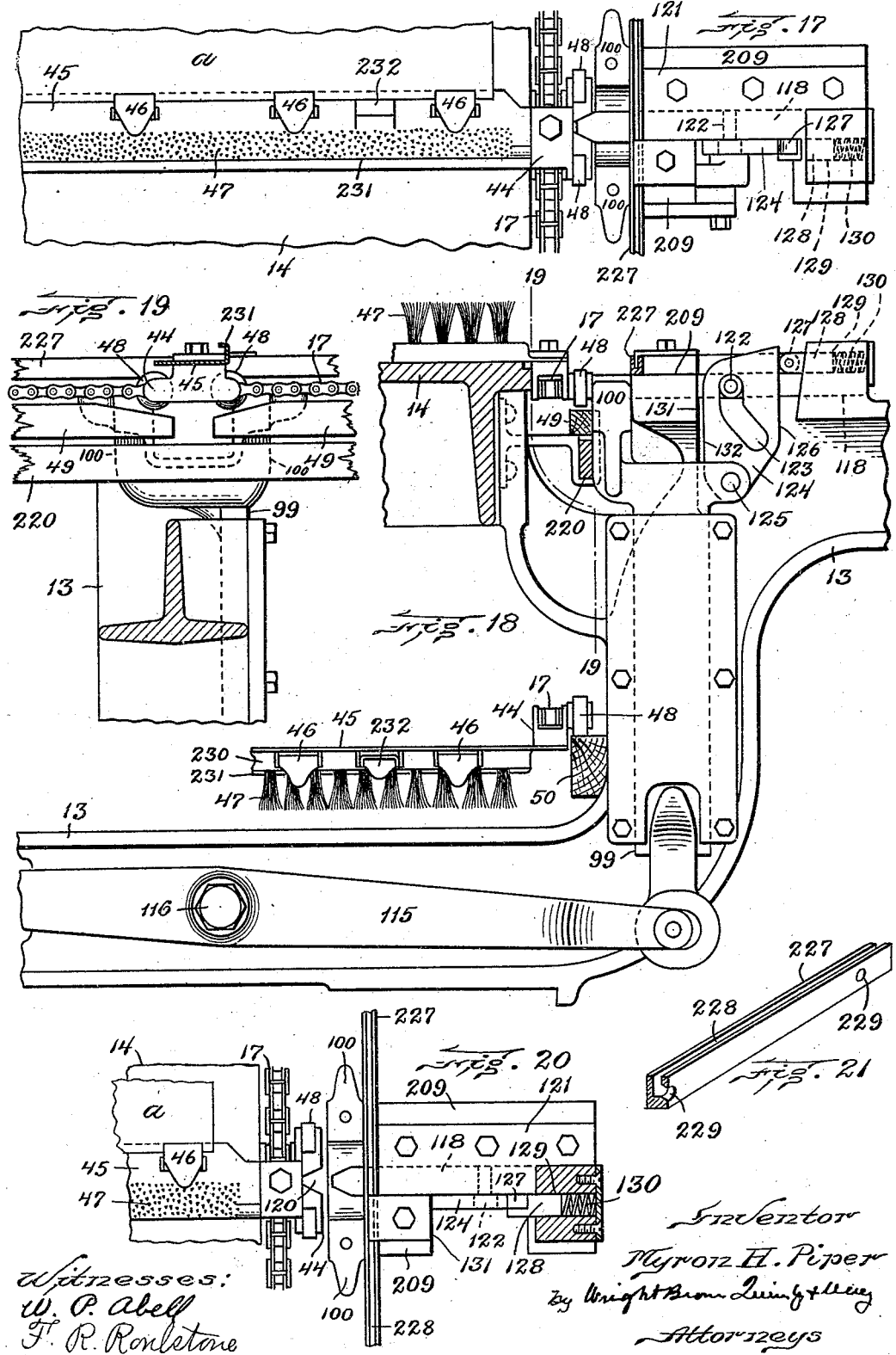

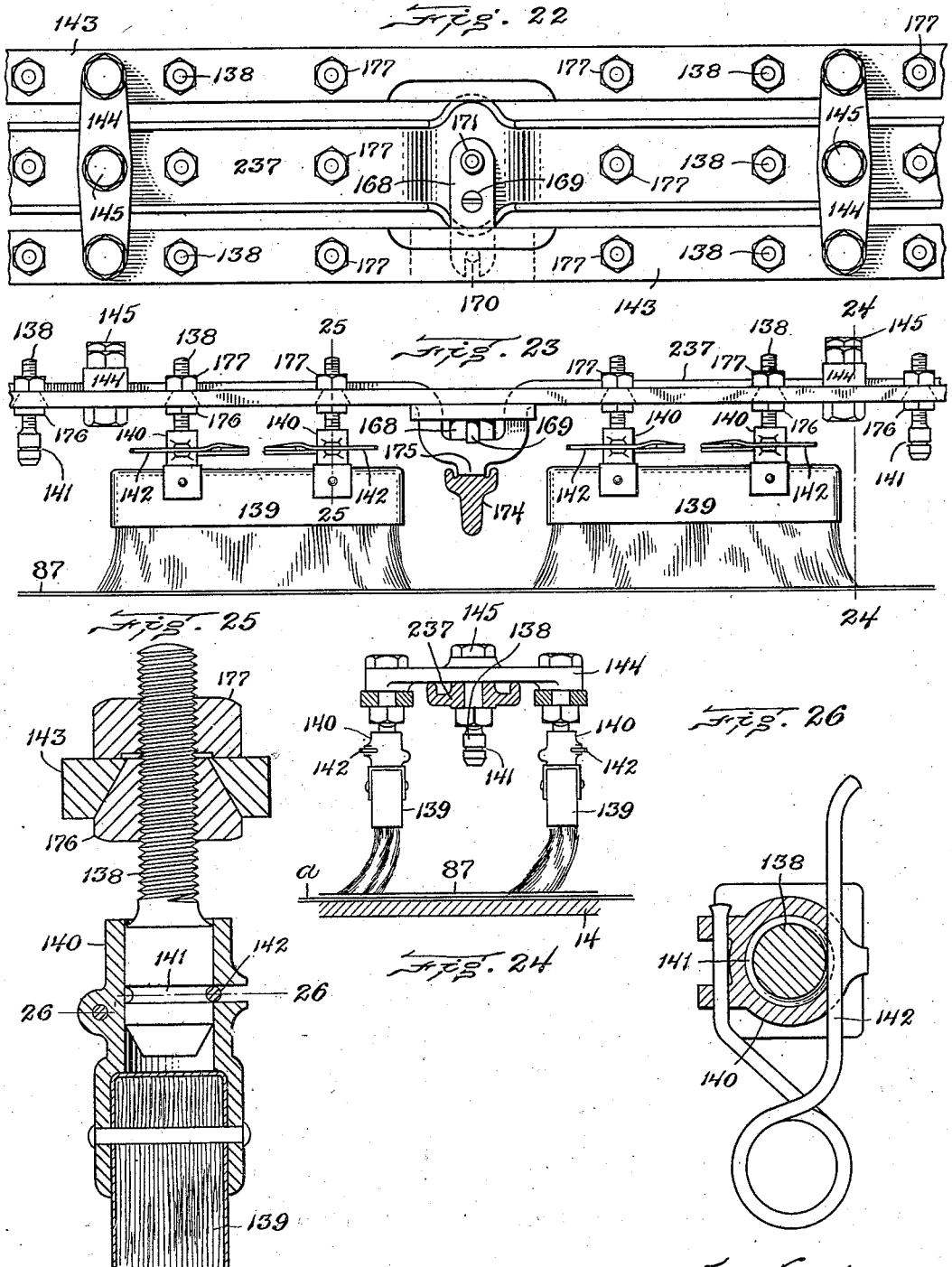

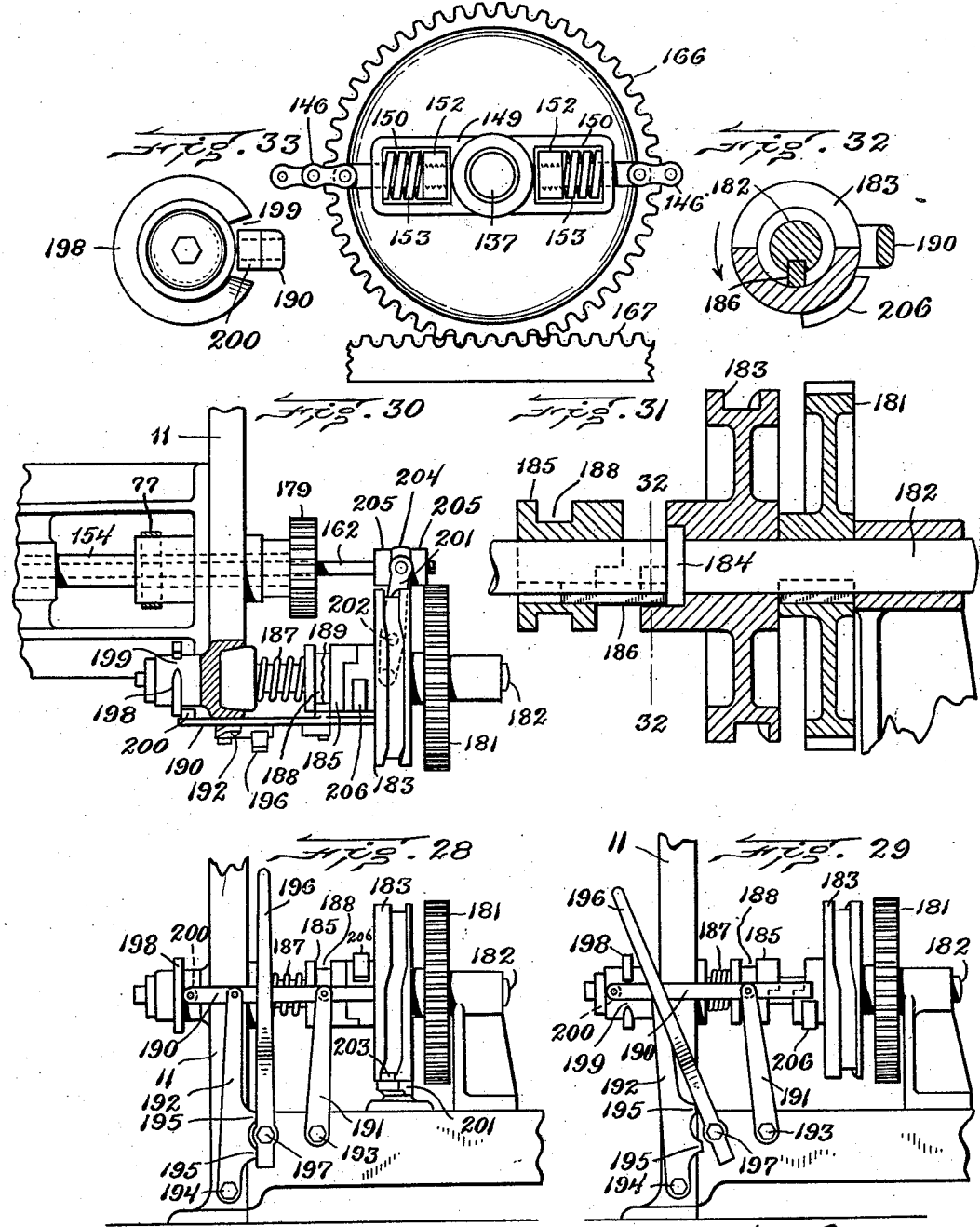

M. H. PIPER.
MACHINE FOR COLORING ILLUSTRATIONS.
APPLICATION FILED DEC. 31, 1908.
929,326.
Patented July 27, 1909.
11 SHEETS—SHEET 11.
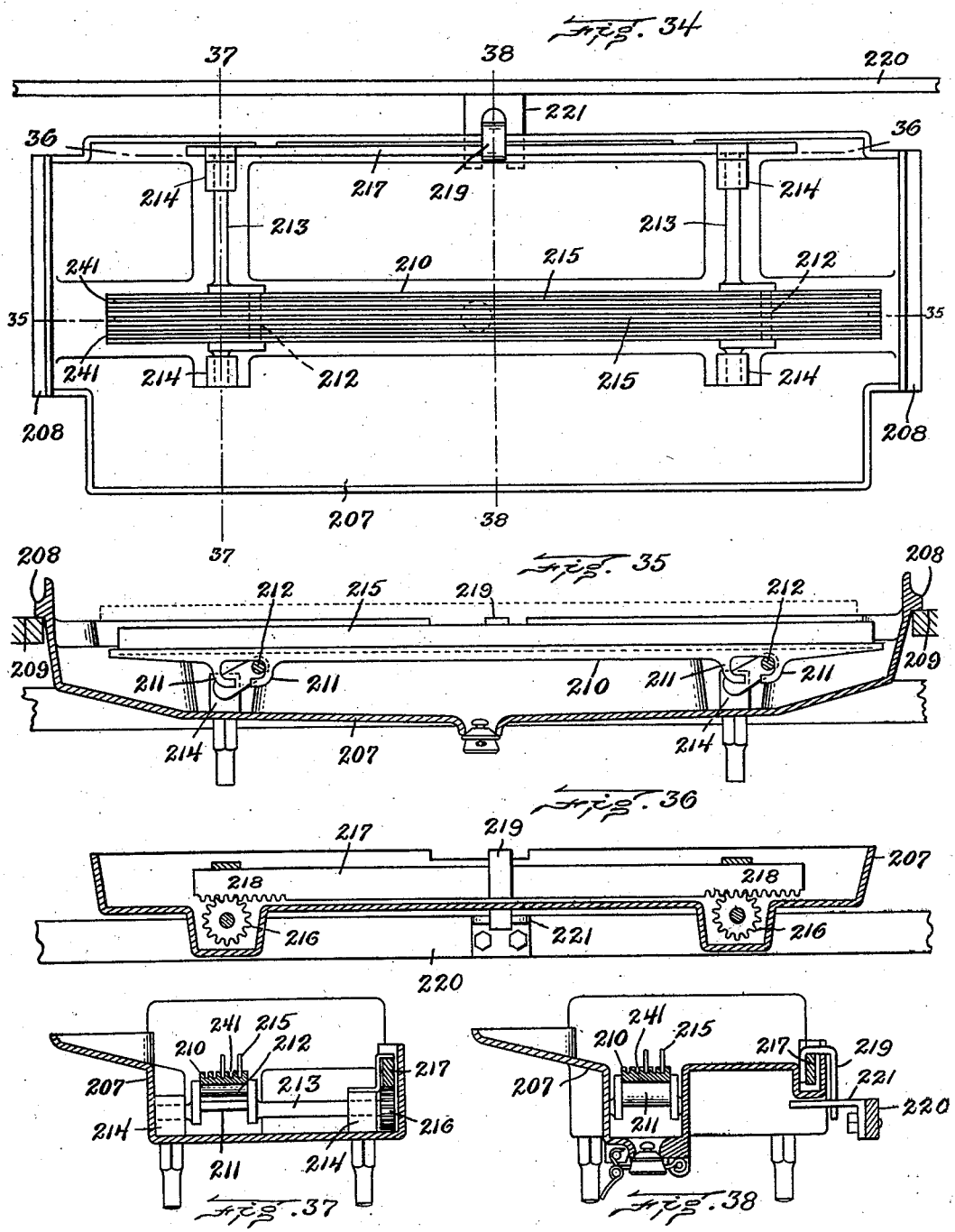

UNITED STATES PATENT OFFICE.

MYRON H. PIPER, OF WALPOLE, MASSACHUSETTS, ASSIGNOR TO UNITED PRINTING MACHINERY COMPANY, OF BOSTON, MASSACHUSETTS, A CORPORATION OF MAINE.

MACHINE FOR COLORING ILLUSTRATIONS.

No. 929,326.   Specification of Letters Patent.   Patented July 27, 1909.

Application filed December 31, 1908. Serial No. 470,155.

*To all whom it may concern:*

Be it known that I, MYRON H. PIPER, of Walpole, in the county of Norfolk and State of Massachusetts, have invented certain new and useful Improvements in Machines for Coloring Illustrations, of which the following is a specification.

This invention relates to machines for coloring pictorial illustrations and the like, in which the paper sheets, on which the illustrations are previously printed, are subjected to a series of applications of different coloring fluids. A machine of this type is divided into sections arranged in a series, through which the sheets are advanced step by step and held immovable between the advances, and, during the pauses of the sheets, the colors are applied through stencils which expose only those portions of the sheets which are to receive the color. The number of sections may be varied according to the requirements, each section being for the exclusive application of one color.

The principal features of the present invention are embodied in the mechanism for conveying the sheets, the mechanism for applying the colors, means for disconnecting the latter mechanism so that it may remain stationary while the conveying mechanism continues, means for positioning the conveying mechanism with absolute precision during each pause thereof, and means for feeding the coloring fluid to the brushes which apply it to the sheets.

Other features in the details of construction are hereinafter described and claimed, and are illustrated upon the accompanying drawings forming a part of this specification.

On the drawings,—Figure 1 represents a left side elevation of the feed end of the machine. Fig. 2 represents a left side elevation of the delivery end thereof. Fig. 3 represents a cross-section on line 3 of Fig. 2. Fig. 4 represents a longitudinal section on line 4 of Fig. 3. Fig. 5 represents on a larger scale a detail of the mechanism of the delivery end. Fig. 6 represents a plan view of the feed end, omitting the device for opening the paper grippers. Fig. 7 represents a plan view on a larger scale of one of the locking devices for the paper conveyer. Fig. 8 represents a longitudinal section of a fragment of the feed end. Fig. 9 represents a plan view of a fragment of the feed table and means for guiding the paper to the grippers. Fig. 10 represents a section on line 10 of Fig. 9. Fig. 11 is a similar view showing a different position of the parts. Fig. 12 is a perspective view of one of the stencil frames. Fig. 13 is a plan view of one corner thereof. Fig. 14 represents a section on line 14 of Fig. 12. Fig. 15 represents a section on line 15 of Fig. 12. Fig. 16 represents a section similar to Fig. 15 but at another point. Fig. 17 represents another of the locking devices for the paper conveyer. Fig. 18 represents a perpendicular section of that portion of the machine shown by Fig. 17. Fig. 19 represents a section on line 19 of Fig. 18. Fig. 20 represents a plan view showing a different position of the locking device shown in Fig. 17. Fig. 21 represents a perspective view of a rail which drains off from the coloring brushes the excess fluid. Fig. 22 represents a top plan view of a portion of the brush carriage. Fig. 23 represents an elevation thereof. Fig. 24 represents a section on line 24 of Fig. 23. Fig. 25 represents a section on line 25 of Fig. 23. Fig. 26 represents a section on line 26 of Fig. 25. Fig. 27 represents an end elevation of the shaft and gearing which vibrate the brushes. Fig. 28 represents an elevation of a disconnectible clutch which governs the brush movement. Fig. 29 is a similar view showing the clutch disconnected. Fig. 30 is a top plan view of the mechanism shown in Fig. 28. Fig. 31 is a vertical section of the clutch members in open position. Fig. 32 is a section on line 32 of Fig. 31. Fig. 33 is an end elevation of the clutch shaft as it appears in Fig. 29. Fig. 34 is a top plan view of one of the color pans. Fig. 35 is a section on line 35 of Fig. 34. Fig. 36 is a section on line 36 of Fig. 34. Fig. 37 is a section on line 37 of Fig. 34. Fig. 38 is a section on line 38 of Fig. 34.

The same reference characters indicate the same parts wherever they occur.

*Frame.*—The supporting frame of the machine is made up of several sections adapted to be bolted together end to end, and to form a complete frame of any desired length, and embracing the desired number of sections. The section at the feed end is represented by the numeral 10, two of these sections being connected side by side so as to support the opposite sides of the machine. The section at the delivery end is represented by the numeral 11, and has a complemental section at the opposite side of the machine arranged in the same manner as the sections which support the feed end. The sections at the feed end and the delivery end are arranged in alinement and are adapted to be connected by any desired number of intermediate sections 12, the number of intermediate sections varying according to the requirements of the machine. According to the present arrangement of the sections, each one includes two sub-divisions, each sub-division constituting one color section. The opposite sides of the base sections are connected by cross girders 13 mounted thereon and supporting a bed plate 14 which is preferably made in sections and arranged so as to present a continuous bed.

*Paper conveyer.*—At the feed end of the frame, there is a feed table 15 upon which the sheets are laid prior to being introduced into the machine. The sheets are fed along the top of the bed step by step and are delivered at the other end to a delivery table 16. In the step by step movement of the sheets, they pause successively at the several color sections during a period in which the color-applying mechanism is actuated, whereupon they are advanced to the next succeeding color section, and so on until they reach the delivery end. The means for conveying the sheets in this manner comprise a pair of endless conveyers 17, one at each side of the bed and so arranged that their upper stretches are approximately level with the top of the bed. The conveyers 17 are here shown as chains which run over sprockets 18 at the delivery end and sprockets 19 at the feed end. The sprockets at the delivery end are secured upon a shaft 20 while the sprockets at the feed end are secured upon a shaft 21. The shafts 20 and 21 are otherwise connected with each other so that they may be driven in unison. The means for so connecting the shafts comprise a longitudinal shaft 22 having at its delivery end a miter gear 23 intermeshing with a similar gear 24 secured upon the shaft 20. At the feed end of the longitudinal shaft is a similar pair of miter gears 25 26 secured respectively upon the longitudinal shaft and the cross shaft.

The power for actuating the conveyer is received from a prime power shaft 27, see Fig. 2, which may be provided with a driving pulley 28 and driven by a belt not shown. The rotation of the shaft 27 is conveyed through a train of gears which reduces the speed and which includes the shafts 29 30 31, a pinion 32 and gear 33 connecting the shafts 27 and 29, a pinion 34 and gear 35 connecting the shafts 29 and 30, and means between the shaft 30 and shaft 31 for imparting to the latter a step-by-step rotation. The means here shown for so driving the shaft 31 is the well known Geneva stop movement, and includes an arm 36 on the end of which is a roll 37 which is adapted to enter successively radial slots 38 formed in a disk 39 affixed upon the shaft 31. The disk 39 is also provided with concaved portions 40 which coöperate with a disk 41 secured upon the shaft 30 and which thereby lock the disk 39 between the movements imparted to it by the arm 36. The shaft 31 is provided with a gear 42 which intermeshes with a pinion 43 on the shaft 20.

The direction of movement of the chain conveyers is indicated by arrows in Figs. 1 and 2. The conveyers are provided with trucks 44 separated by spaces corresponding to the spacing of the color sections. The trucks on the two conveyers are connected in pairs by means of flat bars or strips 45, which, in going forward, pass above the bed, and which, in returning, pass beneath the bed, see Figs. 3 and 18. Each strip 45 is in effect a work carrier and is provided with a plurality of paper grippers 46 by which the forward end of each sheet is gripped at a plurality of points. The means for operating the grippers is hereinafter described. In addition to the grippers, the strips 45 also carry brushes 47 which are adapted to carry oil for the purpose of lubricating the under side of each stencil plate as hereinafter explained. Each truck 44 is provided with a pair of rolls 48 which are adapted to roll upon rails 49 and 50. The rails 49 support the trucks in the upper stretch of the conveyers and are made in sections, see Fig. 19, while the rails 50 which are continuous support the trucks in the lower stretch of the belt.

Referring now to Fig. 8, it will be seen that the feed table 15 is separated from the feed end of the bed by a gap which is adapted to be bridged by means of a plate 51. The plate 51 is mounted by means of hinges 52 upon the end of the bed and is adapted to be alternately raised and lowered so as to open and close the gap for the purpose, first of admitting a work carrier and then for supporting a sheet fed toward the grippers. The plate is normally held by means of a spring 53 in open position, but is adapted to be closed by means of a cam 54 on the sprocket shaft and by a roll 55 coöperating with the cam, and carried by the plate. A similar mechanism is provided at the delivery end for the purpose of guiding the sheets to the delivery table which is separated by a gap from the bed. The gap in this instance is for the purpose of enabling the work carriers to pass downwardly in passing around the sprockets to the lower stretch, and in a similar manner is bridged by means of a plurality of fingers 56 affixed upon a rock shaft 57. The fingers are normally held away from the gap by means of a spring 58 and they are moved into the gap when the rock shaft is oscillated by means of a cam 59 on the sprocket shaft and a roll 60 mounted in an arm 61 secured upon the rock shaft.

*Gripper mechanism.*—The grippers 46 are arranged in the manner best shown by Figs. 6, 8, 10 and 17. Referring first to Fig. 10, it will be seen that the jaw of each gripper coöperates with the rear edge of its carrier and that it is separated therefrom sufficiently to permit the introduction of one edge of a sheet *a*. Each gripper is mounted upon an individual pin 62 about which it turns. It is normally closed by means of a spring 63, and each set of grippers is adapted to be opened as a gang by means of a vertically movable cross bar 64 which descends upon the rear ends of the grippers. The bar 64 is at the feed end of the bed and its manner of operation is hereinafter explained. For the present, it will be sufficient to say that the bar descends only when a gang of grippers pauses beneath it and it rises before the succeeding movement of the conveyers. While the grippers are thus held in open position, a sheet may be manually introduced, and, for the purpose of guiding the forward edge of the sheet between the carrier and the grippers, the bar 64 is provided with spring fingers 65. The bar is also provided with stops 66 which limit the movement of the sheet and position it squarely in the grippers. A gage for determining the lateral position of the sheet is shown in Figs. 6 and 9 and is indicated at 67 on the feed table 15.

Referring now to Figs. 2 and 4, it will be seen that the delivery end of the machine is provided with a drum 68 mounted on a shaft 69 supported in brackets. This drum operates to open the grippers so as to release the sheet, that it may be delivered to the table 16. For this purpose the periphery of the drum 68 is provided with a notch 70 extending from end to end, which is adapted to receive each carrier together with its gang of grippers and lubricating brush 47. The drum 68 is rotated intermittently and in unison with the conveyer by means of sprockets 71 72 and a chain 73 connecting them. The direction of rotation of the drum is indicated by the arrows in Figs. 2 and 4. For the purpose of opening the grippers, the drum is provided with a continuous edge 74 which is adapted to engage the grippers in the same manner as the bar 64 at the feed end. The opening of the grippers takes place while they are in motion and while they are passing around the sprockets 18, and the sheet so released is thereafter advanced to the delivery table by means of delivery rolls 75 and 76. The roll 75 is mounted in a gap formed in the bed, and is driven by means of a belt 77 which appears in Figs. 3 and 30. The rolls 76, of which there are a plurality, are adapted to bear yieldingly upon the top of the roll 75 so that a sheet may pass between them. Each of the rolls 76 is mounted in an arm 78 and the arms 78 are loosely mounted upon a rock shaft 79. For the purpose of holding the rolls 76 against the roll 75, the rock shaft 79 is provided with a rigid finger 80 for each of the arms 78, and springs 81 are interposed between the fingers 80 and the arms 78 so as to apply a yielding tension to the latter. It is desirable that the roll 76 be elevated so as to escape the grippers and the lubricating brushes as they pass beneath, and for this purpose means is provided, see Figs. 2 and 4, which includes an arm 82 on one end of the shaft 79, a rod 85 extending therefrom through ears of a bracket 83, and a cam 84 on the drum shaft 69 adapted to engage the adjacent end of the rod and move it longitudinally in one direction. A spring 86, coiled about the rod, tends to move it in the opposite direction.

*Stencil frames.*—Each sheet, after pausing in one of the color sections, is covered by a stencil which exposes only those portions which are intended to receive color. The stencils are arranged above the bed and in a series, and are alternately raised and lowered so as to permit the step-by-step movement of the carriers which pass between the stencils and the bed. The stencils, however, are sufficiently separated from each other to leave an open space for the carriers when they are at rest, as best shown by Fig. 4. The actual construction of the stencils is shown by Figs. 12 to 16, in which the stencil plate is represented at 87, although no pattern or cutout is here represented. The edges 88 lie parallel with the side edges of the bed, while the edges 89 extend transversely of the bed. The stencil frame is made up of two main supports 90 in the form of bars which extend transversely and of which the ends are tied together by sheet metal strips 91 which are bent as shown by Fig. 14 for the purpose of giving them the necessary rigidity without excessive weight. The ends of the strips 91 are upturned and then bent over the ends of the bars 90 and secured by means of bolts 98. The cross bars 90 and the connecting strips 91 therefor constitute a rectangular frame to which the stencil plate 87 is attached. The method of attaching the stencil plate is to turn the side edges thereof over the strips 91 and to secure them thereto by means of clamping strips 92 and clamping studs 93 provided with nuts 94. In order that the studs 93 may be removably mounted in the strips 91, the latter are provided with apertures 95 which resemble a key-hole in conformation, and in which the studs may be inserted by first introducing the heads into the larger portions of the key holes and then sliding them into the contracted portions thereof. The transverse edges of the stencil plate are turned upwardly and bent over the cross-bars 90, to which they are clamped by means of clamping strips 96 and bolts 97. At those points where the bolts 97 are introduced, the under side of each cross bar is recessed so as to receive inturned portions of the edge of the stencil plate which are slitted for this purpose.

The means by which the stencil frames are mounted and alternately raised and lowered, comprise a plurality of vertically movable slides 99, of which there is one at each end of each cross girder 13. The upper end of each slide 99 is forked and comprises two arms 100. Each of the arms 100 is adapted to receive one end of each cross bar 90 of a stencil frame, see Fig. 7. In this way, one slide 99 supports the adjacent corners of two stencil frames which are secured in place by means of bolts 101. The several slides 99 are moved up and down in unison so as to elevate the stencils simultaneously and permit the movement of the paper conveyer. The slides all receive their movement from a rail 102 extending longitudinally of the machine below the bed, see Fig. 4. The rail is reciprocated longitudinally and intermittently by means of a cam 103 secured upon the shaft 30. Movement is transmitted from the cam to the rail 102 by means of a connecting rod 104, of which one end is pivoted at 105 to the rail and of which the other end is pivotally connected to a swinging arm 106 and which is provided with a cam roll 107. One end of the arm 106 is pivoted at 242 and operates merely to guide and support the connecting rod at that end. The means by which the several slides 99 receive motion from the rail 102 are identical, and a description of one pair will suffice. At points adjacent the cross girders 13, the rail 102 is provided with racks 108. Each rack intermeshes with a pinion 109 mounted upon a stud extending into a bracket on the under side of the girder. The face of the pinion 109 is considerably broader than the face of the rack 108 and intermeshes also with a rack 110 formed on a vertically movable slide 111 mounted on a guide 112. The upper end of the slide has a transverse slot 113 which is sufficiently long to receive side by side a pair of rolls or studs 114. The latter are located on the adjacent ends of a pair of levers 115 which are mounted upon the girder by means of pivot studs 116. The levers 115 extend in opposite directions from the middle of the machine to the opposite sides, and the outer ends thereof are connected to the slides 99, whereby the latter are moved up and down as hereinbefore explained.

*Registering mechanism.*—For the purpose of positioning the sheets with absolute precision in each color section, so as to insure correct registration of the sheets with the stencils, the machine is provided with a plurality of pairs of plungers hereinafter termed " register dogs." The register dogs, which are indicated at 117 and 118, are arranged at opposite sides of the bed and are adapted to move toward and from each other in alinement with the points at which the work carriers sucessively pause. They are adapted to coöperate with notches 119 and 120 formed in the outer sides of the trucks 44. The dogs 117 are all arranged at one side of the bed while the dogs 118 are arranged at the other side. By a similar arrangement, the notches 119 are formed in the trucks of one chain while the notches 120 are formed in the trucks of the other chain, the character of the opposite dogs and notches being somewhat different for a purpose to be explained. The dogs are alternately projected and retracted so as to enter and leave their respective notches, and their movements are so timed that they are projected when the conveyers are at rest and by the same mechanism which moves the stencil frames downwardly. When the stencil frames are elevated, the dogs are retracted, as shown by Fig. 20. The dogs are mounted in guides 121 in which they are longitudinally movable, and each is provided with a stud 122 which projects laterally into a slot 123 formed in a plate or block 124. Each plate 124 is pivotally mounted at 125 upon the upper end of a slide 99, and it has an outer edge 126 which is adapted to coöperate with the roll 127 carried by the plunger 128. The plunger 128 is mounted in a socket 129 and is movable parallel to the path of the dog, and is normally projected toward the bed by means of a spring 130.

When the slides 99 are moved upwardly or downwardly, the slots 123 cause the dogs to move in one direction or the other. The inward movement of the dogs is a yielding movement by reason of the fact that the plates are pivotally mounted and are backed by the spring plungers 128. The outward movement of the dogs, however, is positive and is made so by a perpendicular face 131 formed on the girder and adapted to coöperate with a straight edge 132 of the plate. The inward ends of the dogs 118 and the complemental notches 120 have a simple V-shaped formation. When the dogs 118 are projected into the notches 120, they position the trucks relatively to the longitudinal movement of the conveyers, and at the same time they force the inner sides of the trucks against the longitudinal edge at one side of the bed 14, as best shown by Figs. 17 and 18. This edge of the bed therefore constitutes a gage for determining the lateral position of one end of each carrier, while the longitudinal position of this end of the carrier is determined as already explained.

Referring now to the registering dogs at the other side of the machine shown by Figs. 6 and 7, it will be seen that their ends are not only tapered but have projections 133 whose sides are parallel. The notches 119 likewise have parallel sides as well as beveled corners which facilitate the introduction into the notches of the projections 133. The dogs 117 are actuated in the same manner as the dogs 118, but at no time is their inward movement sufficient to cause their ends to actually seat in the notches. The dogs 117 therefore determine merely the longitudinal registration of one set of carrier ends, while, as already explained, the dogs 118 determine the longitudinal and lateral registration of the other ends. With this combination of registering devices, the position of the sheets is made absolute with relation to the stencils.

*Brush carriage.*—In order to make clear the different directions of movement of the several principal elements of the machine, it may be stated that the work carriers move longitudinally, that the stencils move vertically toward and from the bed, that the brush carriages which support the color brushes move transversely of the bed, and that they move only when the stencils are in their lower position upon the sheets. The movements of the brush carriages relatively to the movements of the stencils are as follows: When the stencils lie upon the sheets, the carriages are moved from one side of the bed to the other, so that the brushes supported thereby may wipe the upper surfaces of the stencils and pass to a position beyond them so as to enable the stencils to rise again and permit the advance of the conveyer. After the conveyer has advanced and come to a state of rest, the stencils are again moved downwardly upon the sheets, and at the same time the register dogs are actuated so as to position the carriers; whereupon the brush carriages, which are stationary meanwhile, move transversely to the other side of the machine where they again dwell during the repetition of the stencil and conveyer movements. It is during these dwells of the carriages that the coloring fluid is fed to the brushes. The carriages are guided and supported at the freed end, at the delivery end, and at suitable points between, by means of guides 134 and rails 174, see Figs. 1, 2 and 3. The ends of the guides and rails are arranged above the bed 14 and are mounted upon the upstanding ends of the cross girders 13. The guides are provided with laterally-extending slots 135 in which are arranged slides or cross heads 136. Each slide provides a bearing for a shaft 137 which extends longitudinally of the machine and thereby maintains the slides in alinement. Each slide is otherwise connected with the next slide by means of a brush carriage or girder 237, in which is arranged a series of studs or brush holders 138 adapted to support color brushes 139. Each color brush has a pair of sockets 140 which fit over a pair of brush holders 138. The studs are provided with peripheral grooves 141 which are adapted to receive spring clips 142 attached to the sockets 140, see Figs. 25 and 26. In addition to the brush holders 138 mounted directly on the carriage 237, there are provided brush bars 143 which extend along the opposite edges of the carriage and which likewise carry brush holders 138. The brush bars 143 are mounted on opposite ends of parallel links 144, which are pivoted midway between their ends upon studs 145 carried by the carriages 237. By means of this method of mounting the brush bars, it may be seen that they are adapted to be vibrated in opposite directions but in parallelism.

The means for moving the carriages back and forth across the bed of the machine includes a chain conveyer 146 at the delivery end, which runs over sprockets 147 and 148 located at opposite ends of the carriage guide. The slide 136 at the delivery end is connected to the opposite ends of the otherwise continuous chain 146, as shown by Figs. 3 and 27. Referring particularly to Fig. 27, it will be seen that the end of the shaft 137 extends into a block 149 which is formed with chambers 150. Plungers 151 extend from the chambers 150 in opposite directions and are attached respectively to opposite ends of the chain 146. The inner ends of the plungers are screw-threaded and are provided with nuts 152 while helical springs 153 are coiled about the plungers between the nuts and the outer walls of the chambers, and serve as cushions which maintain sufficient tension on the chain 146 and afford a yielding connection which avoids a shock when the chain 146 is set in motion. The chain receives its motion from a shaft 154, see Fig. 3, which rotates in but one direction, but, by means of suitable driving connection, the chain is driven alternately in one direction and then in the other. The means for driving the chain includes an upstanding shaft 155 on whose upper end is a bevel gear 156 intermeshing with a gear 157 secured upon the shaft 158 which carries the sprocket 148. The lower end of the shaft 155 is provided with a miter gear 159 which intermeshes with a pair of miter gears 160 161 loosely mounted on the shaft 154. Either one or the other of the latter gears is adapted to be coupled with the shaft 154 so as to drive the gear 159 in one direction or the other. For this purpose, the shaft 154 is made of hollow formation and is provided with an internal rod 162 and with an external sliding block 163 located between the gears 160 and 161. The rod and block are connected with each other by means of a key 164 which extends through a longitudinal slot in the shaft 154 and which compels the block to rotate with the shaft. The block is provided with projections 165 which extend longitudinally in both directions and which are adapted to engage complemental projections or sockets (not shown) on the gears 160 and 161.

The delivery end only of the brush carriage is moved by means of a chain, and, in order to insure corresponding movement of the carriage at the feed end, the shaft 137 is provided with gears 166, of which there is one keyed at each end and at as many intermediate points as desired. These gears are intermeshed with racks 167 which are positioned in the brush-carriage guides 134 and therefore cause all portions of the brush carriages to move at the same rate of speed. It is obvious that the shaft 137 receives its rotation from the lateral movement of the carriage. This rotation of the shaft is utilized for the purpose of vibrating the brush rods 143. At points midway between the brush-carriage guides, the carriages are formed with depressions in which are mounted levers 168 which are adapted to oscillate about fulcrums 169, see Figs. 1, 2, 4 and 22. The outer ends of the levers 168 are slotted and engage pins 170 projecting from the brush rods 143 on one side. The inner ends of the levers 168 are provided with rolls 171 which occupy serrated grooves 172 formed in cam disks 173 keyed upon the shaft 137. By this method of connection, each pair of brush rods 143 connected by the levers 144 receives a vibratory motion, their directions of movement being opposite to each other. The object of vibrating the brush rods in opposite directions is to equalize the momentum of the moving parts and so to avoid excessive vibration of the machine as a whole.

With reference now to Figs. 1 and 2, it will be seen that the cams 173 are so arranged that their grooves 172 are opposed to each other with regard to the direction of movement which they impart to their respective levers 168. The effect of so arranging the cams is to further equalize the vibration of the brush rods by causing the right hand rod of one pair to move in the opposite direction to that of the corresponding rod of the next pair. The brush carriages 237 are otherwise supported midway between the brush-carriage guides by the rails 174, upon which feet 175 formed upon the brush carriages are adapted to slide.

The studs 138, which receive the color brushes 139, are adjustably mounted in the brush carriages or in the brush rods, as the case may be, by means of nuts 176 177. The studs are provided with external threads and extend through the nuts of which one is tapered, as shown in Fig. 25, and which occupies a tapered socket formed in the under side of its support to receive it. The stud, together with its nut 176, is drawn up and clamped in its supporting member by means of the nut 177. The lower ends of the studs 138 are beveled, as shown in Figs. 24 and 25, in order to facilitate the placing of the brushes. In order to further facilitate the placing of the brushes, the springs 142 mounted thereon are arranged so as to extend in opposite directions, so that the operative, in placing the brush upon any pair of studs, may retract one spring with a finger of one hand, while he retracts the other spring with a finger of the other hand in grasping the brush in both hands.

By reference to Fig. 4, it is apparent that the brush holders 138 in each series are spaced at equal distances apart and that a brush may be mounted upon any adjacent pair of stems within the series. By means of this arrangement, the brushes on the opposite brush bars may, if desired, be staggered in order to provide the desired arrangement of the brushes upon the stencils.

*Throw-out for brush carriage.*—Means are provided for disconnecting the brush carriage from the source of power so that, if desired, the conveyer mechanism may be permitted to continue if it is desired to stop the movement of the brush carriage. This means is shown in Figs. 3, and 28 to 33, and derives its power from the shaft 30. The power for driving the shaft 154 is taken from the shaft 29 by means of gears 178 and 179, of which the former is secured upon the shaft 29 and the latter upon the inner end of the shaft 154, as shown by Fig. 3. The effect of the shaft 30 in this connection is not to furnish the power for the brush carriage but merely to govern the application of the power furnished by the shaft 29. A gear 180, secured upon the shaft 30, intermeshes with and drives a gear 181 keyed upon a stud shaft 182, see Fig. 31. The shaft 182 carries a cam 183 loosely mounted thereon between the gear 181 and a collar 184. The hub of the cam 183 is formed as one member of a positive clutch of which the complemental member is formed upon a sleeve 185 likewise mounted upon the shaft and adapted to slide endwise upon a spline 186. The collar 185 rotates with the shaft and furnishes rotation for the cam 183 only when it is engaged therewith. A spring 187, coiled about the shaft and compressed between the sleeve 185 and the base member 11, normally tends to hold the sleeve in driving relation with the cam 183. The sleeve, however, is provided with a peripheral groove 188 which is occupied by a projection 189 carried by a rod 190 by which the clutch members may be disconnected. The rod 190 is mounted upon two swinging arms 191, 192 pivoted respectively at 193, 194 to the frame. The arm 192, at a point between the rod 190 and the pivot 194, is provided with projections 195 which are adapted to engage a manually operative lever 196 on opposite sides of the fulcrum 197 thereof. The lever 196, when moved about its fulcrum, swings the arm 192 so as to retract the sleeve 185, but, in order that the two clutch members may not be disconnected when the brush carriage is moving over the bed 14 of the machine, the shaft 182 is provided with a collar having a peripheral flange 198 in which is a notch 199. The rod 190, which extends in both directions beyond the arms 191 and 192, has on the latter end a projection 200 which is adapted to engage the flange. The rod 190 may be operated to disconnect the clutch members only when the notch 199 of the flange is in alinement with the projection 200, as shown by Fig. 29. When the notch is in this position, the driving member 163 (Fig. 3) is in a neutral position between the gears 160 161, and the brush carriages are at one side of the machine.

The means for operating the clutch member on the shaft 154 includes a lever 201 which is mounted upon a fulcrum 202 and of which one end has a roll 203 which occupies the groove in the cam 183. The other end of the lever 201 is forked, as shown by Figs. 2 and 3, and embraces a swiveled block 204 which bestraddles the rod 162 and which is confined between collars 205 affixed upon the rod. The conformation of the groove in the cam 183 is such as to move the rod 162 from one extreme to a neutral position midway between its extremes, and, after a pause in the neutral position, to advance it to the other extreme where it dwells. In the reverse movement, the rod 162 is first moved to the neutral position where it again pauses and then moves on to the extreme first mentioned. The effect of this movement of the rod is to move the clutch member 163 into engagement, first with the gear 160, then to a neutral position in which it is engaged with neither of the gears 160 and 161, and then to a position in engagement with the gear 161. In this way, the brush carriage is moved from one side of the machine to the other where it dwells during the hereinbefore described movements of the conveyer and stencils, after which the brush carriage is moved back to its former position on the other side of the machine.

In order to prevent undue rotation of the cam 183 while it is disconnected from the clutch member 185, the hub of the cam is provided with a strip or projection 206 which is adapted to engage that end of the rod 190 which extends beyond the arm 191. The extension of the arm serves as a stop against which the projection 206 may rest while the clutch members are disengaged, and it holds the cam in such position that, when the clutch members are permitted to coöperate, they shall be in the correct relative position to become interlocked immediately.

*Color feeding mechanism.*—For the purpose of feeding a fluid coloring substance to the color brushes 139, the machine is provided with color pans 207, of which there is a pair for each stencil. The color pans are mounted on opposite sides of the frame, as shown by Figs. 1, 2 and 6, and their arrangement and operation is such as to feed the liquid to the brushes during the dwell of the brush carriages at either side of the machine. The details of construction of one of the color pans are shown by Figs. 34 to 38. The ends of each color pan are formed with shoulders 208 which are adapted to overlie the ends of the adjacent cross girders 13. For this purpose, the cross girders are formed with flat horizontal surfaces 209 upon which the color pans are adapted to slide toward or from the bed 14. Under ordinary circumstances, the color pans are positioned close to the bed, in which position they are operative, but, if for any reason it should be desired to render a color pan inoperative, it may be manually moved away from the bed to an inoperative position. When the brush carriages are at either of the two extremes of movement, the brushes depend over one set of color pans, and, for the purpose of feeding the color contained in the pans to the brushes, the pans are equipped with dipping devices which have the form of bars 210. The bars extend longitudinally in the color pans which are formed with recesses for the purpose, and their ends are formed with curved fingers 21 which embrace cranks 212 formed on the shafts 213 mounted in the bearings 214 in the pans.

The shafts 213, of which there is a pair in each color pan, are adapted to be oscillated, and, when so moved, they cause their bars 210 to describe a movement in an arc. Each bar 210 is formed with a series of longitudinal parallel grooves 241 in which may be inserted any desired number of strips or ribs 215. The strips 215, when the bar is at one extreme or the other of its movement, lie wholly or partially submerged in the coloring fluid contained in the pan, but, when the bar 210 is moved as described, the ribs 215 rise sufficiently to engage and wipe the bristles of a color brush hanging thereover, and, in so doing, they deposit a quantity of coloring fluid upon the brushes. After wiping the brushes, the strips again descend into the fluid, although but a single movement is imparted thereto. The means for oscillating the shafts 213, so as to move the dipping device back and forth through an arc, comprise a pinion 216 on each shaft, a bar 217 having a pair of racks 218 for each of the pinions 216, a finger 219 projecting inwardly and downwardly from the bar 217, and a longitudinal movable rod 220 extending along each side of the machine. Each rod 220 is provided with a series of forked members 221, each embracing the finger 219 of a color pan. When the rods 220 are reciprocated, as hereinafter described, they cause simultaneous actuation of all of the dipping devices.

At the delivery end of the machine, the rods 220 are each connected with the free end of a swinging arm 222. The arms 222 (see Figs. 2 and 4) are affixed upon a rock shaft 223 which is provided between its ends with a downwardly extending arm 224, at the lower end of which is a roll 225 which coöperates with a cam 226 affixed upon the shaft 30.

The dipping devices and color pans may be made to feed more or less of the coloring fluid to the brushes by increasing or decreasing the number of strips 215. The method of attaching the strips so that they shall not become dislodged from the grooves 241 is to bend them slightly before inserting them in the slots. The resiliency of the strips then operates to bind them firmly against the walls of the grooves. In the matter of feeding the coloring fluid to the brushes, very fine graduation is often necessary, and, in order to insure the feeding of the precise quantity of fluid, not only the number of strips may be varied, but the lengths and locations thereof in the slots may likewise be varied. For instance, if the cut-out or pattern in the stencil exposes portions which are unevenly distributed, it may be desirable to feed the coloring fluid more copiously in the line of the greatest exposed portion without feeding an excessive quantity of fluid to that portion of the brushes which pass over the smaller exposed portion. In such a case, a greater quantity of coloring fluid could be fed to one part of the brush by inserting in the dipping device an extra short strip 215. Each side of the machine is provided with a narrow rail 227 which extends longitudinally and which is formed with a groove 228 in the form of a trough, see Figs. 3, 6, 7, 18 and 21. The rails 227 lie between the bed 14 and the two rows of color pans, their upper edges being in a plane slightly above the lower extremities of the color brushes. The color brushes, after receiving a feeding of fluid, pass over and engage the rails 227 in approaching the stencils. The brushes, by so engaging the rails 227, deposit thereon whatever excess coloring fluid they may contain, and the fluid which is so deposited in the grooves 228 is permitted to drain back into the color pans through apertures 229 formed in the rails, as shown by Fig. 21.

The lubricating brushes 47, of which there is one with each gang of paper grippers 46, are employed for the purpose of lubricating the work-engaging surfaces of the stencils. The purpose of so lubricating the stencils is to prevent the coloring fluid about the margins of the patterns or cut-outs from flowing upon the sheets beyond the limits of the pattern. The backs 230 of the brushes are confined between the flanges 231 formed on the carrier strips 45, and spring clips 232 mounted on the strips. The springs 233 serve to hold the clips in either open or closed position, as may be seen by reference to Fig. 11. The lubricant is fed to the brushes while they are traveling in the lower stretch of the conveyer, and a device for this purpose is shown in Fig. 1. It comprises a shallow pan 234 containing absorbent material 235 saturated with a suitable lubricant. The pan 234 is mounted so that the absorbent material 235 lies in the path of the depending brushes and its position may be varied so as to afford more or less contact with the brush and thereby to feed more or less lubricant to the bristles. For this purpose, one edge of the pan 234 is provided with hooked arms 236 which rest upon a cross bar 238 whose ends are supported by bars 239. The opposite edge of the pan is adapted to be supported at any desired height by reason of the fact that the arms 236 may swing to a limited extent upon the supporting bar 238. The adjustable edge of the pan is supported by set screws 240 which have threaded connection in the bars 239, and by this means, the height of this edge of the pan may be varied as desired. In the position shown, the lubricating pad 235 lies parallel with the direction of movement of the brushes and thereby is adapted to deliver a maximum quantity of lubricating material to the brushes. If it should be desired to lessen the quantity of lubricant delivered to the brushes, the set screws 240 could be set so as to drop the pan 234 slightly away from the path of the brushes, in which case the pan would lie at an inclination and only its upper edge would be in a position to be engaged by the brushes.

As heretofore stated, the rails 49, on which the trucks 44 in the upper stretch of the conveyer travel, are made in sections. Fig. 19 shows the adjacent ends of two sections of the rail 49 which are inclined at their extremities. The extremities are separated by gaps which coincide with the positions at which the trucks dwell during the pauses of the conveyer, and they are for the purpose of enabling the carrier strips 45 to lie upon the bed 14. When, however, the conveyer is in motion, the trucks ride upon the inclined ends of the rails and thereby elevate the carrier strips 45 slightly above the bed 14 and so avoid the possibility of unnecessary friction which would otherwise, in the course of time, unduly wear away the strips.

Having thus explained the nature of my said invention, and described a way of constructing and using the same, although without attempting to set forth all of the forms in which it may be made or all of the modes of its use, what I claim is:

1. In a machine for coloring illustrations, a series of stencils, means for feeding the work step by step to successive stencils, said means including a series of carriers extending transversely of the path of movement, a series of gripping devices on each carrier and arranged to engage the forward edge of the work, a transverse brush adapted to be mounted on each carrier to wipe the work-engaging surface of each stencil, and spring clips on the carrier for detachably securing the back of the brush.

2. In a machine for coloring illustrations, a bed for the work, a series of carriers for the work, means for moving the series step by step along the bed, means for locking the carriers against one edge of the bed, and means for locking the opposite extremities of the carriers against longitudinal movement.

3. In a machine for coloring illustrations, a bed for the work, a series of work carriers extending laterally and movable longitudinally of the bed, means at one side of the bed for locking one end of each operative carrier against longitudinal and lateral movement, and means for locking the other ends of said carriers against longitudinal movement.

4. In a machine for coloring illustrations, a bed for the work, a series of work carriers extending laterally of the bed, means for moving the carriers longitudinally of the bed, means adapted to lock one end of each carrier against one longitudinal edge of the bed at a plurality of points, and means adapted to lock the other end of each carrier against longitudinal movement.

5. In a machine for coloring illustrations, a series of color-brush carriages, means for moving the carriages back and forth in unison, vibratory brush holders on each carriage movable transversely of the path of the carriages, and means for vibrating the holders, those of one carriage in the opposite direction to those of another carriage.

6. In a machine for coloring illustrations, a series of color-brush carriages, means for moving the carriages back and forth in unison, a pair of bars on each carriage, movable transversely of the path of the carriage, brush holders on each bar, and means for vibrating the bars so that each moves in the opposite direction both as to that of its associate and to the corresponding bar of the adjacent pair.

7. In a machine for coloring illustrations, a series of color-brush carriages, means for moving the carriages back and forth in unison, vibratory bars on each carriage, and a series of brush holders on each of the carriages and bars, the holders of each series being spaced equi-distantly.

8. In a machine for coloring illustrations, a series of color-brush carriages arranged end to end, movable bars on each carriage, brush holders on each bar, means for moving one end of one carriage, and means for distributing such movement equally to both ends of all the carriages, and for converting bodily movement of the carriages into vibratory movement of the brush bars.

9. In a machine for coloring illustrations, a continuously rotating power shaft, color applying means, continuously rotating means driven by said shaft for driving the color applying means and adapted to be rendered operative and inoperative for the purpose, and means for confining the continuously rotating means in its operative or inoperative state.

10. In a machine for coloring illustrations, a color-brush carriage, a power shaft, disconnectible means driven by the shaft for actuating the carriage, disconnectible governing means driven by the shaft for connecting and disconnecting the carriage actuating means, and manually operative means for controlling said governing means.

11. In a machine for coloring illustrations, a color-brush carriage, a power shaft, disconnectible means driven by said shaft for actuating the carriage, normally connected governing means driven by said shaft for connecting and disconnecting the carriage-actuating means, means for preventing alteration of said governing means in all positions except one, and manually operative means for disconnecting the governing means.

12. In a machine for coloring illustrations, work-feeding means, a stencil adapted to engage the work, manually releasable means on the work-feeding means adapted to receive and hold a brush in a position in which the brush would be adapted to engage the work-engaging surface of the stencil, and a brush adapted to be so held by said releasable means.

13. In a machine for coloring illustrations, a series of work carriers movable in an endless path, a series of stencils for the work, a brush on each carrier adapted to engage the work-engaging surfaces of the stencils, and adjustable means in the path of the bristles for lubricating the bristles, said means being adapted to present more or less lubricating surface to the brushes.

14. In a machine for coloring illustrations, a brush carriage, a series of brush holders mounted equi-distantly thereon, and one or more brushes each provided with a pair of sockets and spring fasteners adapted to embrace any two adjacent holders.

15. In a machine for coloring illustrations, a color receptacle, a brush carriage movable to and from a position over the receptacle, and a feeding device movable bodily from within the receptacle to a position in the path of the brush bristles.

16. In a machine for coloring illustrations, a color receptacle, a brush carriage movable to and from a position over the receptacle, means for elevating the coloring substance, and strips on the elevating means extending longitudinally of their movement and arranged to enter edgewise into the bristles of a brush.

17. A machine for coloring illustrations, a color receptacle, an elevating device movable in a curved path in opposite direction from a position above the receptacle to points below the level of the coloring substance, strips extending longitudinally on the upper side of said device, and a brush carriage movable to and from a position in which the brush bristles lie in the path of said strips.

18. In a machine for coloring illustrations, a color receptacle, an elevating device movable into and out of a body of coloring substance, grooves in said device extending longitudinally of its movement, and strips adapted to set in and project from said grooves.

In testimony whereof I have affixed my signature, in presence of two witnesses.

MYRON H. PIPER.

Witnesses:
 WALTER P. ABELL,
 P. W. PEZZETTI.